(12) United States Patent
Kerres

(10) Patent No.: US 11,278,879 B2
(45) Date of Patent: Mar. 22, 2022

(54) CROSS-LINKED HIGH STABLE ANION EXCHANGE BLEND MEMBRANES WITH POLYETHYLENEGLYCOLS AS HYDROPHILIC MEMBRANE PHASE

(71) Applicants: between Lizenz GmbH, Stuttgart (DE); Thomas Häring, Stuttgart (DE)

(72) Inventor: Jochen Kerres, Stuttgart (DE)

(*) Notice: Subject to any disclaimer, the term of this patent is extended or adjusted under 35 U.S.C. 154(b) by 427 days.

(21) Appl. No.: 16/312,975

(22) PCT Filed: Jun. 22, 2017

(86) PCT No.: PCT/DE2017/000179
§ 371 (c)(1),
(2) Date: Jun. 24, 2019

(87) PCT Pub. No.: WO2017/220065
PCT Pub. Date: Dec. 28, 2017

(65) Prior Publication Data
US 2020/0023348 A1  Jan. 23, 2020

(30) Foreign Application Priority Data

Jun. 22, 2016 (DE) .................... 10 2016 007 815.4

(51) Int. Cl.
*B01J 41/13* (2017.01)
*B01D 69/02* (2006.01)
(Continued)

(52) U.S. Cl.
CPC .............. *B01J 41/13* (2017.01); *B01D 69/02* (2013.01); *B01D 71/28* (2013.01); *B01D 71/52* (2013.01);
(Continued)

(58) Field of Classification Search
CPC ....................................................... B01J 41/13
See application file for complete search history.

(56) References Cited

PUBLICATIONS

Morandi et al. "Novel imidazolium-functionalized anion-exchange polymer PBI blend membranes" Journal of Membrane Science, 476, 2015, 256-263. (Year: 2015).*

* cited by examiner

*Primary Examiner* — Peter F Godenschwager
(74) *Attorney, Agent, or Firm* — Edward C. Kwok; VLP Law Group, LLP

(57) ABSTRACT

The invention relates to: —anion exchange blend membranes consisting the following blend components: —a halomethylated polymer (a polymer with —$(CH_2)_x$—$CH_2$—Hal groups, Hal=F, Cl, Br, I; x=0-12), which is quaternised with a tertiary or a n-alkylated/n-arylated imidazole, an N-alkylated/N-arylated benzimidazole or an N-alkylated/N-arylated pyrazol to form an anion exchanger polymer. —an inert matrix polymer in which the anion exchange polymer is embedded and which is optionally covalently crosslinked with the halomethylated precursor of the anion exchanger polymer, —a polyethyleneglycol with epoxide or halomethyl terminal groups which are anchored by reacting with N—H-groups of the base matrix polymer using covalent cross-linking—optionally an acidic polymer which forms with the anion-exchanger polymer an ionic cross-linking (negative bound ions of the acidic polymer forming ionic cross-linking positions relative to the positive cations of the anion-exchanger polymer)—optionally a sulphonated polymer (polymer with sulphate groups —$SO_2Me$, Me=any cation), which forms with the halomethyl groups of the halomethylated polymer covalent crosslinking bridges with sulfinate S-alkylation. The invention also relates to a method for producing said membranes, to the use of said membranes in electrochemical energy conversion processes (e.g. Redox-flow batteries and other flow batteries, PEM-electrolyses, membrane fuel cells), and in other membrane methods (e.g. electrodialysis, diffusion dialysis).

3 Claims, 11 Drawing Sheets

(51) Int. Cl.
  *B01D 71/28*      (2006.01)
  *B01D 71/52*      (2006.01)
  *B01D 71/68*      (2006.01)
  *B01J 41/14*      (2006.01)
  *C08J 5/22*       (2006.01)
  *C25B 13/08*      (2006.01)
  *H01M 8/1025*     (2016.01)
  *H01M 8/1032*     (2016.01)
  *H01M 8/18*       (2006.01)

(52) U.S. Cl.
  CPC .............. *B01D 71/68* (2013.01); *B01J 41/14* (2013.01); *C08J 5/2231* (2013.01); *C25B 13/08* (2013.01); *H01M 8/1025* (2013.01); *H01M 8/1032* (2013.01); *H01M 8/188* (2013.01); *B01D 2325/42* (2013.01); *C08J 2325/18* (2013.01); *C08J 2481/06* (2013.01)

CROSS-LINKED HIGH STABLE ANION EXCHANGE BLEND MEMBRANES WITH POLYETHYLENEGLYCOLS AS HYDROPHILIC MEMBRANE PHASE

SUMMARY

The invention comprises:
anion-exchange blend membranes from the following blend components:
A halomethylated polymer (a polymer having —$(CH_2)_x$—$CH_2$-Hal which is tertiary or N-alkylated/N-arylated Imidazole, an N-alkylated/N-arylated benzimidazole or an N-alkylated/N-arylated pyrazole is quaternized to an anion exchange polymer.
An inert matrix polymer in which the anion exchange polymer is embedded and which is optionally covalently crosslinked with the halomethylated precursor of the anion exchange polymer.
A polyethylene glycol having epoxide or halomethyl end groups anchored by reaction with basic N—H groups of the basic matrix polymer covalently crosslinked
Optionally an acidic polymer which forms ionic crosslinking with the anion exchange polymer (negative fixed acid ions form ionic crosslink sites to the positive cation of the anion exchange polymer)
Optionally a sulfinated polymer (polymer having sulfinate groups —$SO_2Me$, Me=any cation) which forms covalent crosslinking bridges with the halomethyl groups of the halomethylated polymer under sulfinate S-alkylation
Process for the preparation of these membranes
Use of these membranes in electrochemical energy conversion processes (eg redox-flow batteries and other flow batteries, PEM electrolyses, membrane fuel cells, and in other membrane processes (eg electrodialysis, diffusion dialysis).

STATE OF THE ART

Over the past few decades, researchers' interest in anion exchange membranes (AEMs) for use in electrochemical conversion processes has greatly increased. Possible fields of application of AEMs are alkaline polymer electrolyte fuel cells (APEFCs), alkaline polymer electrolyte electrolysis (APEE), redox flow batteries (RFBs), reverse electrodialysis (RED) and bioelectrochemical systems, including microbial fuel cells (MFCs) and enzymatic fuel cells. In addition, anion exchange membranes are used in electrodialysis (ED) and in Donnan or diffusion dialysis (DD). A major advantage of using AEM in electrochemical conversion processes such as fuel cells or electrolysis is that when using AEMs for the electrocatalytic reactions at the electrodes no precious metal catalysts consisting of platinum group metals (PGM) are required, thus containing AEM Membrane electrode assemblies (MEAs) are significantly less expensive than cation exchange membrane (CEM) containing MEAs. AEMs have the following major drawbacks compared to CEMs:

(1) The ionic conductivity of most AEM types is significantly lower than that of CEMs of comparable ion exchange capacity (IEC), in part because most of the AEMs have a hydrocarbon backbone that is significantly less hydrophobic than the perfluorinated one, for example the polymer backbone of the perfluorinated membranes of the Nafion® type, so that in the AEM it comes to a lower separation between ionic groups and polymer backbone, which leads to lower ionic conductivity because of the then lower local density of the anion exchange groups, especially in most AEM types, the solid cations are attached to the polymer backbone via a $CH_2$ bridge.

(2) In particular, when the AEMs are exchanged with the $OH^-$ ion, for example when used in APEFC or APEE, their chemical stability is limited, since the $OH^-$ counterion of the anion exchange group can degrade the positively charged solid ion itself or the polymer main chain.

The global efforts in this research and development segment are aimed at minimizing these disadvantages of AEMs and thus improving their properties. As starting polymers for AEM often polymers are used which contain aromatic groups, such as polystyrene, polyphenylene ethers or other aromatic polyethers such as polyethersulfones, polyether ketones etc., which may be substituted with methyl groups. The first step in the preparation of AEM is the synthesis of a polymer with halomethyl side groups. Halomethylation is achieved by (1) chloro- or bromomethylation with hydrogen halide, formaldehyde, and a Lewis acid such as $ZnCl_2$ or $AlCl_3$ (Blanc reaction), or (2) bromination of the CHs pendant group of aromatic polymers with N-bromo-succinimide (NBS) by the Wohl-Ziegler bromination reaction. The Blanc reaction is associated with the appearance of the highly carcinogenic by-product bis (chloromethyl) ether. For this reason, the Wohl-Ziegler reaction is now preferably used in the production of halomethylated aromatic polymers. Literature examples for the preparation of bromomethylated aromatic polymers by the Wohl-Ziegler reaction are the bromomethylation of polyphenylene oxide or the bromomethylation of a methylated polyethersulfone. Conversion of the $CH_2Hal$ group (Hal=Cl, Br) to an anion exchange group is achieved by reaction with a tertiary amine such as trimethylamine [24], pyridine, pentamethylguanidine or an N-alkylated imidazole.

One way to increase the conductivity of AEM is to increase the separation between polymer backbone and ion group phase in the AEM to obtain a larger local density of ion-conducting groups. Phase-segregated AEMs having improved ionic conductivity are obtainable by the preparation of linear block copolymers of hydrophobic and ionic blocks or by graft copolymers having an anion exchange group-containing graft side chain (Example: grafting of vinylbenzyl chloride side chains to $e^-$-irradiated ETFE, and quaternization of the chloromethylated side chains with trimethylamine).

In order to achieve an improvement in the chemical stability of AEM, the combination of anion exchange group and polymer main chain must always be investigated, since the stability of the anion exchange group always depends on the polymer main chain. Thus, it could be shown for polystyrene (PSt) substituted with the solid cation benzyltrimethylammonium that in alkaline medium (0.6M KOH, 80° C.) the solid cation is somewhat more stable than if PPO is substituted with the same group and much more stable than if pendent to polyphenylene ether sulfone (PES). It is not easy to predict which polymer backbone is more stable, as can be seen in the above example, since all three polymers PSt, PPO and PES contain electron-rich aromatic groups linked together by ether groups in both PPO and PES.

It has been found, however, that apparently by steric shielding of the anion exchange groups of AEM, in particular their alkali stability can be significantly improved, since then the nucleophilic attack of the OH— counterions on the quaternary ammonium group is difficult. In a study by Holdcroft et al, two different polybenzimidazolium (PBIm+) AEMs were tested for their stability in the alkaline medium. One of the PBIm+-AEMs had methyl groups on the aromatic adjacent to the dimethylbenzimidazolium cation, the others did not. While the sterically hindered PBIm+-AEM showed a very high stability in 2M KOH, the sterically unhindered PBIm+-AEM was degraded very rapidly. The very high stability of the sterically hindered PBIm+-AEM was explained by the authors of this study as follows: at the sterically hindered PBIm+-AEM, the OH— group can not attack the imidazolium ring, while at the non-hindered PBIm+-AEM the OH— can attack the imidazolium ring under ring opening. Herring et al. synthesized sterically highly-hindered PPO-AEM functionalized with 1,4,5-trimethyl-2-(2,4,6-trimethoxyphenyl)-imidazolium anion exchange groups, which were also characterized by excellent alkaline stability (no decrease in ion exchange capacity after 25 hours storage in 1 M KOH at 80° C.). In contrast, dimethylimidazolium-modified PPO showed a large decrease in ion-exchange capacity (approximately 50% decrease in 2M KOH at 60° C. after 9 days). The experimental findings can be summarized in that the steric shielding of the anion exchange groups is one way to increase the chemical stability of AEM.

Other strategies for reducing the chemical degradation of AEM are:
(1) Search for alternative solid cations
(2) chemical and/or physical crosslinking
(3) embedding the anion exchange polymer in an inert matrix polymer.

As alternative cations to the most commonly used trialkylammonium groups are the already mentioned pentamethylguanidinium groups (PMG) come into consideration. However, it has been found that the PMG cations are chemically stable only when they are resonance-stabilized (ie, the positive charge of the PMG cation is delocalized), which is the case when attached to an aromatic (possibly electron-deficient) moiety, as Kim et al. could show. Another example of a sterically hindered chemically stabilized cationic functional group is the tris (2,4,6-trimethoxyphenyl) phosphonium cation, which was attached to polyvinylbenzyl chloride graft chains and after 75 hours of storage in 1N NaOH at 60° C. had no degradation. In a work by Zha et al., for example, a positively charged bis (terpyridine) ruthenium (II) complex was attached to a norbornene polymer. The AEM thus prepared showed excellent stability in an alkaline environment: incorporation of the polymer in 1N NaOH at room temperature showed no degradation even after half a year.

Another way of stabilizing AEM is to cross-link them. Thus, in a work by He et al. PPO-based AEMs were synthesized, which were cross-linked in a multi-step process with tertiary diamines and vinylbenzyl chloride under quaternization, resulting in mechanically very robust covalently cross-linked AEMs. In a study by Cheng et al. For example, chloromethylated PSU was cross-linked with a novel N-basic difunctional reagent, guanimididazole, under quaternization. These new crosslinked polymers showed better alkali stability than corresponding AEMs quaternized without crosslinking with 1-methylimidazole.

In our group, bromomethylated PPO embedded in the matrix polymer PVDF was quaternized with the diamine DABCO and with 1,4-diiodobutane to mechanically and chemically covalently crosslinked AEM. Even after 10 days of incorporation in 1N KOH at 90° C. no degradation of IEC and conductivity was observed. Moreover, the membranes showed good performance in direct methanol fuel cells (DMFC) (4M MeOH and 5M KOH). In another study, PBIOO (manufacturer: Fuma-Tech) methylated by a new non-carcinogenic reagent was blended with sulfonated PSU and covalently crosslinked under quaternization and alkylation using DABCO and 1,4-diiodobutane. These AEM were tested in a DMFC using non-platinum catalysts (anode: 6% Pd/CeO 2/C, cathode: 4% FeCo/C) and gave a good performance at 80° C. (anode feed 4M MeOH+5M KOH) comparable to a commercial Tokuyama-AEM (maximum power density 120 mW/cm$^2$). Another study of our work group comprises the synthesis of ionically and covalently cross-linked AEM blends of bromomethylated PPO or a bromomethylated and partially fluorinated arylene main chain polymer and a partially fluorinated PBI ($F_6$PBI) as a mechanically and chemically stable matrix and a sulfonated polyethersulfone sPPSU added in deficit. The halomethylated blend component was quaternized with N-methylmorpholine (NMM) to the anion exchange group. The interaction between the sulphonate groups of the sulphonated polymer and the basic N-methylmorpholinium cations resulted in the formation of ionic crosslinks, which led to an improvement in the mechanical and chemical stability of the AEM blend. The alkali stability of the membranes was examined in 1M KOH at 90° C. over a period of 10 days as compared to a commercial Tokemama AEM (A201). The most stable of the produced AEM blends lost about 40% of their original Cl$^-$ conductivity while the commercial A201 only had 21% of the original conductivity after that period. Similar AEM blends were synthesized in another work: brominated PPO was blended with PBIOO or $F_6$PBI as the matrix polymer, and to the blend of brominated PPO and $F_5$PBI, sPPSU was further added as an ionic crosslinker. The quaternization of the bromomethylated PPO to generate the anion exchange groups was carried out with 1-methylimidazole or 1-ethyl-3-methylimidazole. Examination of the alkali stability (1M KOH, 90° C., 10 days) revealed a conductivity of 69% of the original conductivity for the blend membrane of 1-methylimidazole-quaternized PPO, $F_6$PBI and sPPSU as ionic crosslinker after the stability test, while the blends from PPO quaternized with the two imidazoles and PBIOO had a residual ionic conductivity between 31 and 43% of the original value.

In addition to chemical stability, the achievement of the highest possible selectivities for certain anions is an important research and development topic of AEM, when used in electrodialysis or diffusion dialysis. Sata et al. investigated the dependence of the permeation of different anions on the hydrophobicity of the AEM functional groups. The hydrophobicity of the AEM functional groups has been systematically increased by increasing the length of the quaternary ammonium ion-bonded alkyl chains of trimethylbenzylammonium, triethylbenzylammonium, tri-n-propylbenzylammonium, tri-n-butylbenzylammonium, and tri-n-pentylbenzylammonium. It has been found that as the hydrophobicity of the ammonium group increases, the relative transport of large hydrate shell anions, such as sulfate or fluoride ions, to anions with smaller hydration shells, such as chloride or nitrate, significantly decreases. In another study, in which AEMs were hydrophilized by impregnation with ethylene glycols of different molecular masses, a marked increase in membrane permselectivity was observed for anions with large hydration shells, such as sulfate or fluoride. In a work by Hickner et al, AEMs were synthesized consisting of rigid/flexible semi-interpenetrating networks of triethylamine-quaternized PPO and a polyethylene glycol network. It was found that this AEM has a high ionic conductivity ($\sigma_{OH^-}$ up to 80 mS/cm) and a high alkali stability (degradation of ionic conductivity between 25 and 30% within 30 days of storage in 1M NaOH at 80° C.). In another work, polyethylene glycols were grafted onto chloromethylated SEBS polymers, and the resulting copolymers were then quaternized with trimethylamine. The resulting AEMs showed very high mechanical and chemical stabilities in 2.5M KOH at 60° C. (increasing the ionic conductivity during storage in the KOH from 20 to 24 mS/cm) and high ionic conductivities ($\sigma_{OH^-}$ up to 52 mS/cm).

The above-mentioned own studies have shown that covalent or ionic crosslinking and/or embedding of the anion exchange polymer in a chemically stable polymer matrix is a viable way to obtain chemically and mechanically stable AEMs. This work and work from the scientific community on AEMs with sterically hindered cationic groups as well as AEMs with additional hydrophilic phase are the starting point for the novel anion-exchange blend membranes described in this invention.

DESCRIPTION OF THE INVENTION

Surprisingly, it has been found that in anion-exchange blend membranes composed of the following blend components:

A halomethylated polymer quaternized with a sterically hindered tertiary nitrogen compound (a polymer having —$(CH_2)_x$—$CH_2$-Hal groups, Hal=F, Cl, Br, I; x=0-12, for example chloromethylated polystyrene or bromomethylated polyphenylene oxide;

Examples of sterically hindered tertiary nitrogen compounds are:

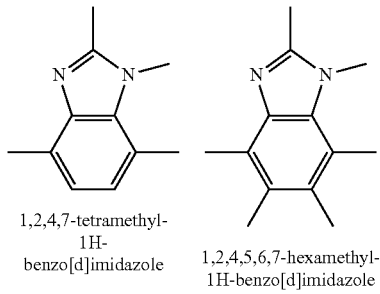

1,2,4,7-tetramethyl-
1H-
benzo[d]imidazole 1,2,4,5,6,7-hexamethyl-
1H-benzo[d]imidazole

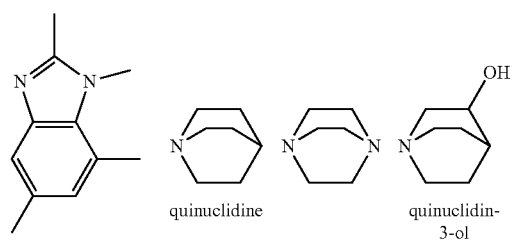

1,2,5,7-tetramethyl-
1H-
benzo[d]imidazole 1,4-diazabicyclo[2.2.2]octane quinuclidine quinuclidin-
3-ol

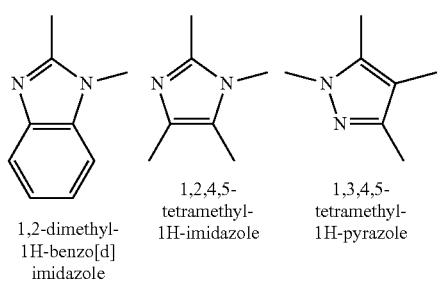

1,2-dimethyl-
1H-benzo[d]
imidazole 1,2,4,5-
tetramethyl-
1H-imidazole 1,3,4,5-
tetramethyl-
1H-pyrazole

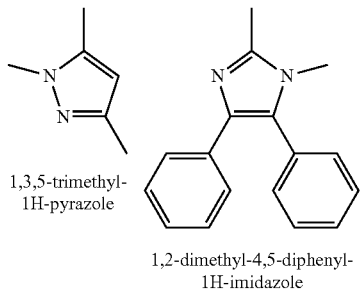

1,3,5-trimethyl-
1H-pyrazole 1,2-dimethyl-4,5-diphenyl-
1H-imidazole

Examples for halomethylated polymers are:

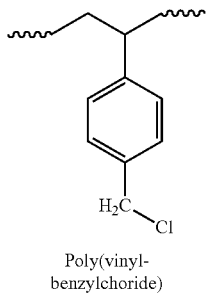

Poly(vinyl-
benzylchoride)

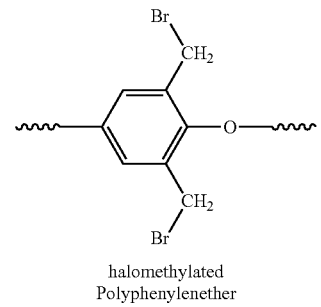

halomethylated
Polyphenylenether

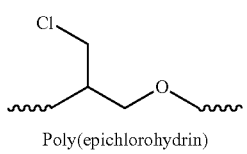

Poly(epichlorohydrin)

-continued
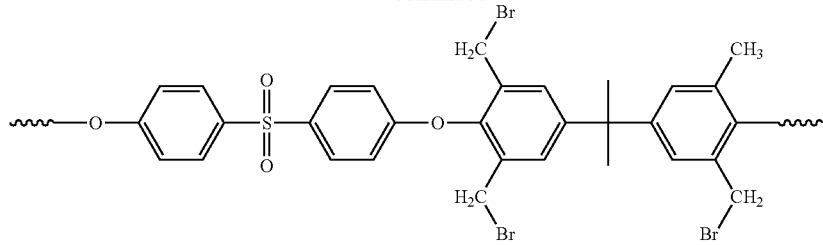
bromomethylated Poly(ethersulfon)
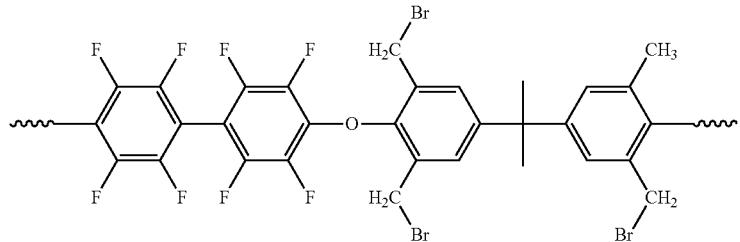
bromomethylated partially fluorinated aromatic Polyether I
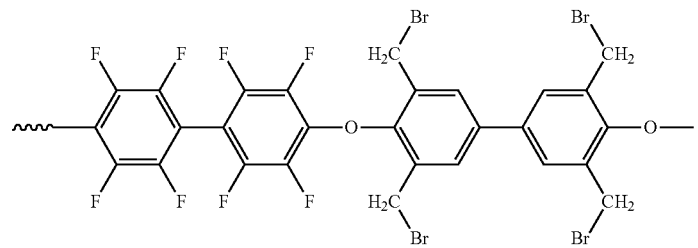
bromomethylated partially fluorinated aromatic Polyether II
a matrix polymer, for example a basic polybenzimidazole;
Examples of basic matrix polymers are:
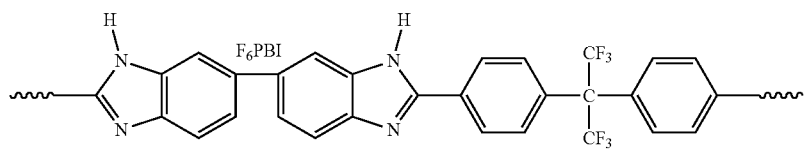
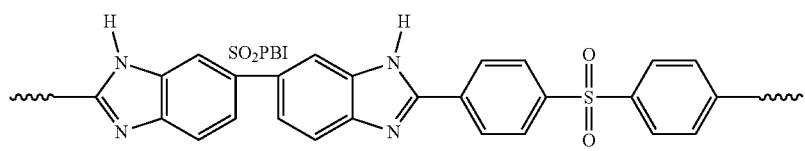
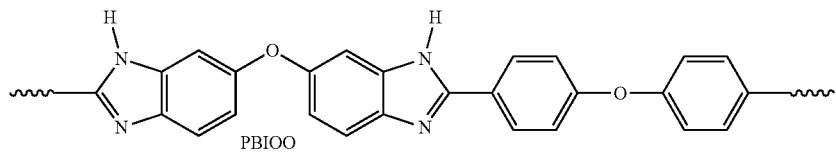
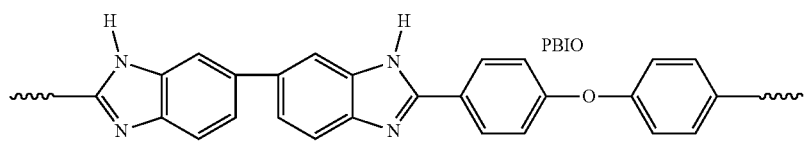

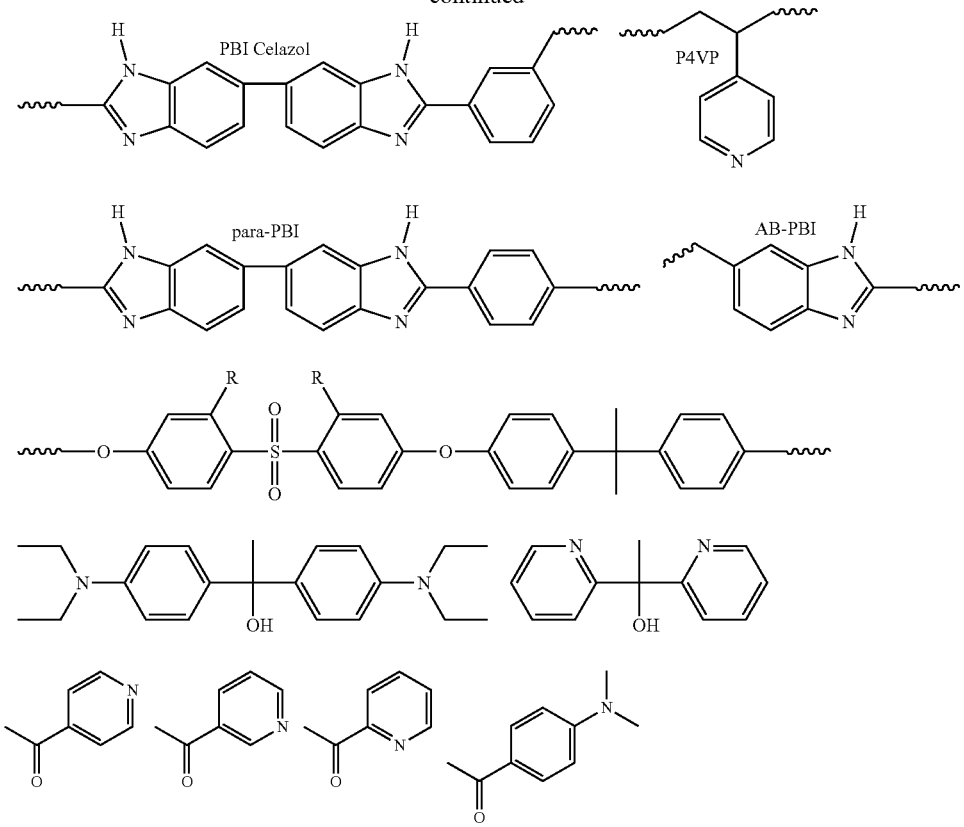

optionally a sulfonated aryl polymer as an ionic macromolecular crosslinker (ionic crosslinking with the basic functional groups of the matrix polymer and with the anion exchange groups of the quaternized halomethylated polymer.

Examples of sulfonated aryl polymers are:

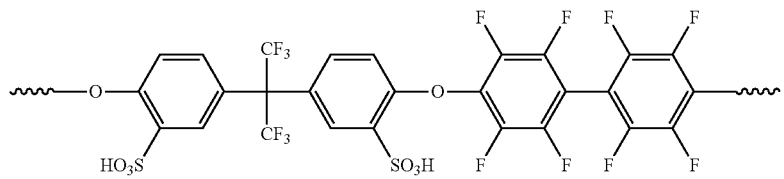

sulfonated partially fluorinated aromatic polyether I (designation SFS001)

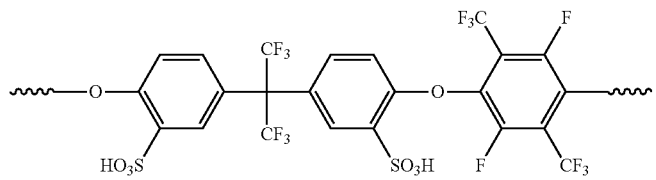

sulfonated partially fluorinated aromatic polyether II

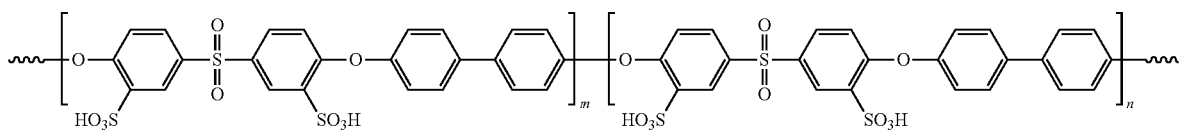

sulfonated Poly(phenyleneethersulfone), statistic Copolymer (designation SAC098)

-continued

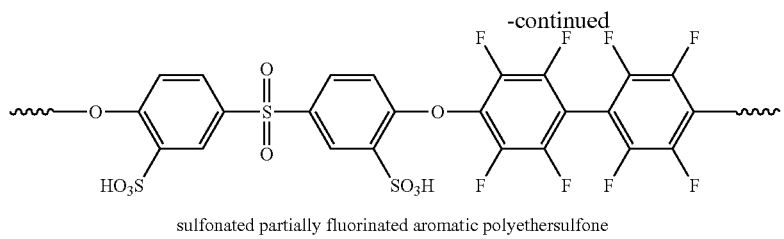
sulfonated partially fluorinated aromatic polyethersulfone

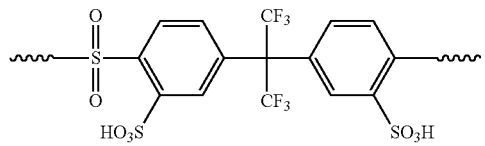
sulfonated partially fluorinated aromatic Poly(sulfone)

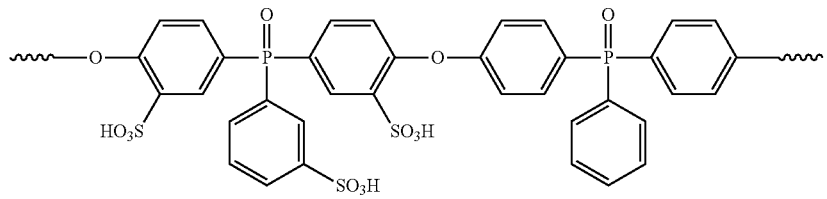
sulfonated aromatic Poly(phenylphosphinoxide) I

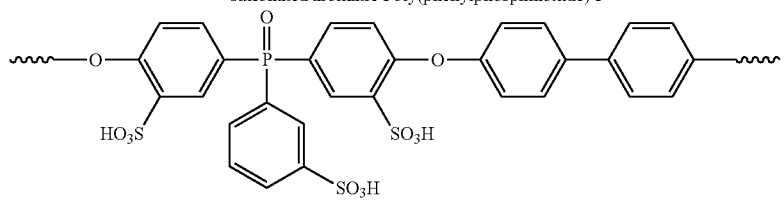
sulfonated aromatic Poly(phenylphosphinoxide) II optionally a sulfonated polymer as a covalent macromolecular crosslinker whose sulfinate groups undergo covalent crosslinking via the sulfinate-S-alkylation with the halomethyl groups of the halomethylated polymer. As an example, the covalent crosslinking reaction between a sulfonated and a halomethylated polymer is shown:

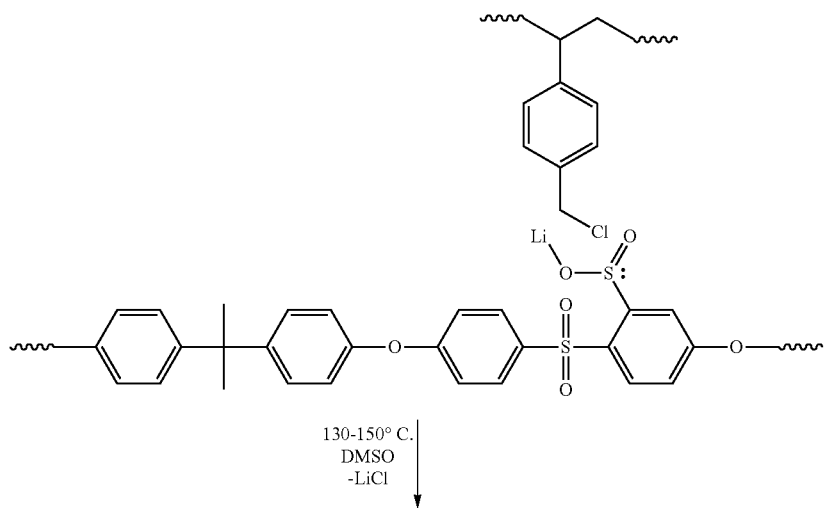

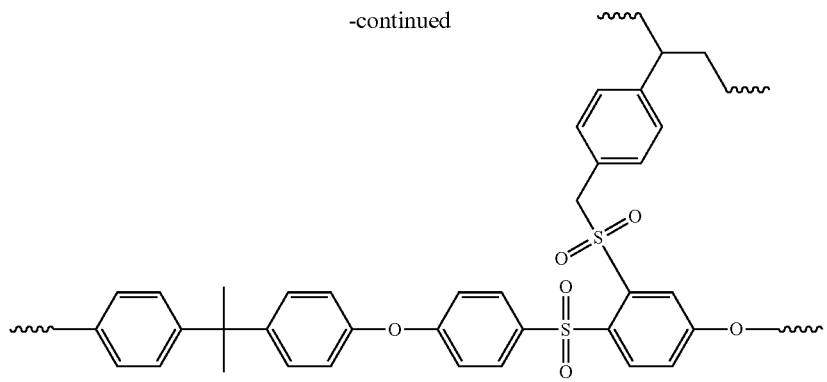

The addition of a hydrophilic linear polyethylene glycol bearing functional groups on both chain ends which can undergo nucleophilic substitutions with the basic functional groups of the matrix polymer (examples: epoxide groups, halomethyl groups) and thereby covalently anchored in the blend membrane which leads to the following property enhancements of the anion exchange blend membranes:

To a significant increase in the anion conductivity towards the previously measured with best for anion exchange membranes conductivity values to a significant improvement in the chemical stability in strongly alkaline solutions even at elevated temperatures (for example, 1 molar aqueous KOH solution at 90° C.)

covalent crosslinking by the epoxide-terminated polyethylene glycols, which leads to a reduction in the swelling and thus to an improvement in the mechanical stability.

The crosslinking reaction of the polyethylene glycols with the basic groups of the matrix polymers is schematically illustrated below for the reaction of an epoxide group-terminated polyethylene glycol with the imidazole group moieties of a polybenzimidazole:

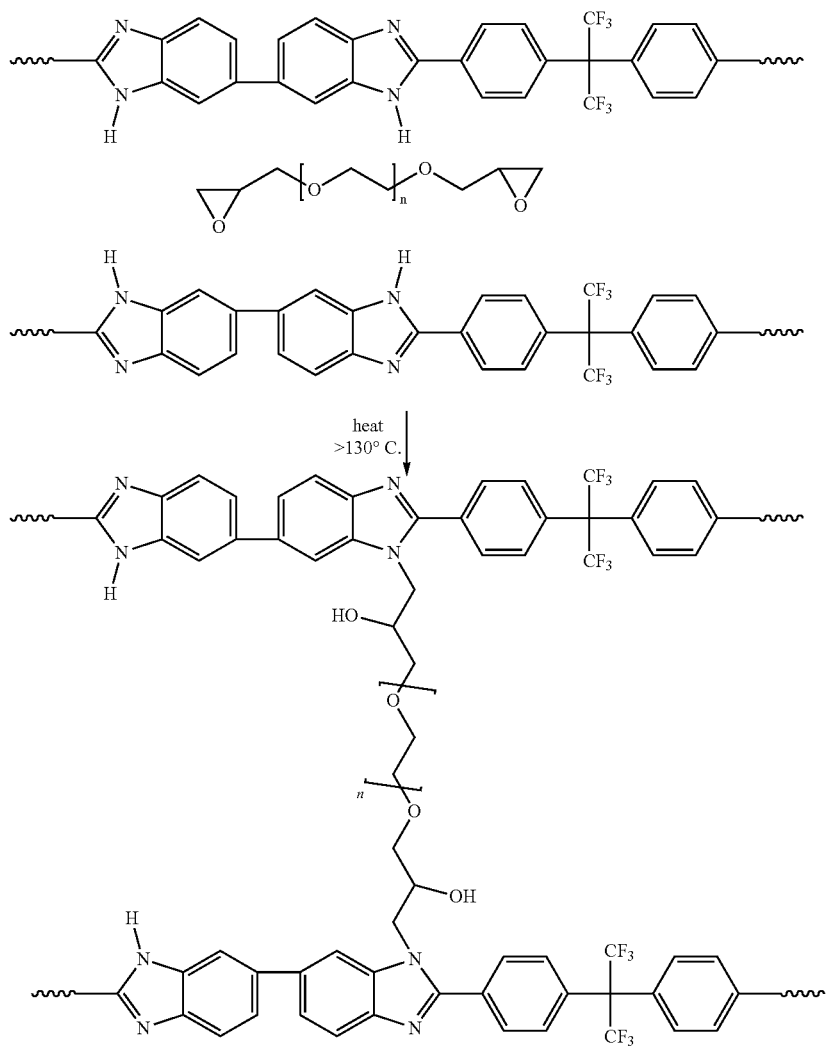

Surprisingly, it has furthermore been found that the membrane properties such as conductivity and thermal and chemical stability, in particular stability in strongly alkaline solutions such as aqueous potassium hydroxide solution or sodium hydroxide solution can be further improved by a sulfinated polymer optionally added to the blend mixture. In particular, it has surprisingly been found that the sulfinate groups of the sulfinated polymer are capable of reaction with epoxy or halomethyl end groups of the polyethylene glycol, presumably under sulfinate S-alkylation of the sulfinate groups by the epoxide or halomethyl groups. The reaction of the sulfinate groups of the sulfinated polymer with the epoxide end groups of the polyethylene glycol are shown below:

The anion-exchange blend membranes (AEBM) according to the invention can be obtained by means of three process routes:

1) The polymeric blend components (halomethylated polymer, matrix polymer (eg polybenzimidazole), polyethylene glycol with epoxide or halomethyl end groups, optionally sulfonated polymer and/or sulfinated polymer) are co-agitated in a dipolar aprotic solvent or in a mixture of different dipolar aprotic solvents (examples: N, N-dimethylacetamide, N-methylpyrrolidinone, N-ethylpyrrolidinone, dimethylsulfoxide, sulfolane). Thereafter, the polymer solutions are doctored or cast on a support (glass plate, metal plate, plastic film, etc.), and the solvent is evaporated in a circulating air dryer or a vacuum oven at temperatures

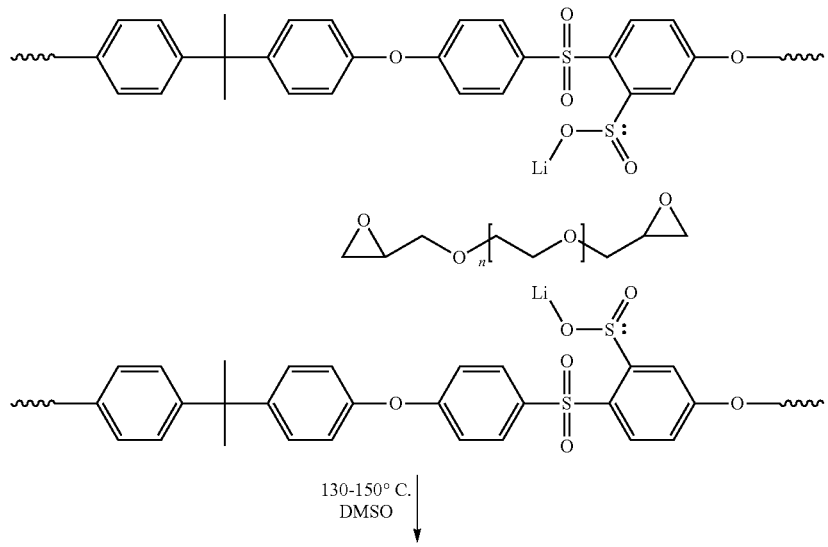

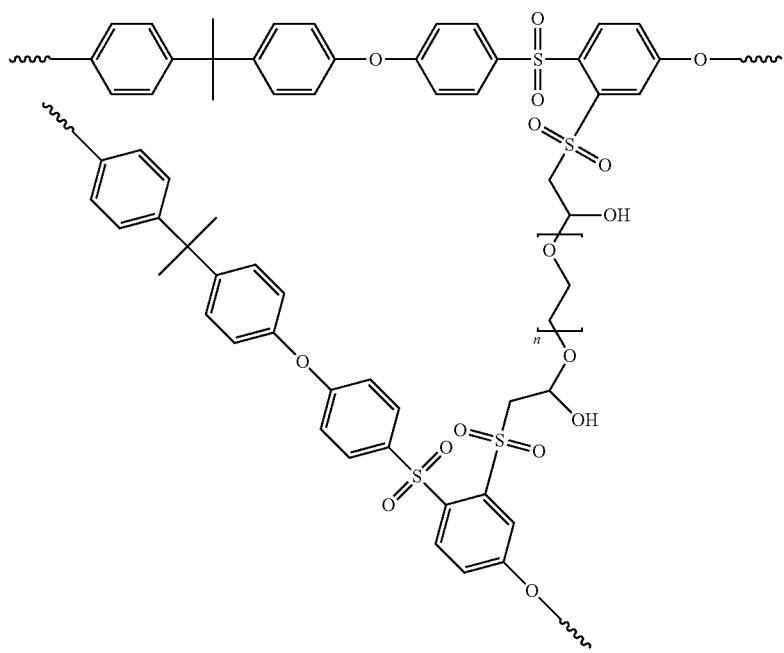

between room temperature and 150° C. Thereafter, the polymer film formed is removed from the backing and aftertreated as follows: 1) in a 10-50% solution of the tertiary amine or N-monoalkylated (benz) imidazole or N-monoalkylated pyrazole in an alcohol (preferably ethanol or 2-propanol) or in water or a water/alcohol mixture at temperatures from room temperature to the boiling point of the solvent for a period of 24-72 hours; 2) demineralized water at T=room temperature to T=90° C. for a period of 24-72 hours; 3) 10% aqueous NaCl solution at T=room temperature to T=90° C. for a period of 24-72 hours; 4) DI water at T=room temperature to T=90° C. for a period of 24-72 hours.

2) The polymeric blend components (halomethylated polymer, matrix polymer (eg polybenzimidazole), polyethylene glycol with epoxide or halomethyl end groups, optionally sulfonated polymer and/or sulfinated polymer) are co-mixed in a dipolar aprotic solvent or in a mixture of different dipolar aprotic solvents (examples: N, N-dimethylacetamide, N-methylpyrrolidinone, N-ethylpyrrolidinone, dimethylsulfoxide, sulfolane). Thereafter, the tertiary amine or the N-monoalkylated (benz) imidazole or N-monoalkylated pyrazole is added either in bulk or dissolved in a dipolar aprotic solvent in a molar excess of 50-200%, based on the concentration of halomethyl groups, to the solution, Thereafter, the polymer solutions are doctored or cast on a support (glass plate, metal plate, plastic film, etc.), and the solvent is evaporated in a circulating air dryer or a vacuum oven at temperatures between room temperature and 150° C. Thereafter, the polymer film formed is removed from the support and aftertreated as follows: 1) optionally in a 10-50% solution of the tertiary amine or N-monoalkylated (benz) imidazole or N-monoalkylated pyrazole in an alcohol (preferably ethanol or 2-Propanol) or in water or a water/alcohol mixture at temperatures from room temperature to the boiling point of the solvent for a period of 24-72 hours; 2) demineralized water at T=room temperature to T=90° C. for a period of 24-72 hours; 3) 10% aqueous NaCl solution at T=room temperature to T=90° C. for a period of 24-72 hours; 4) DI water at T=room temperature to T=90° C. for a period of 24-72 hours.

3) All components of the polymer blend are separately dissolved in a dipolar aprotic solvent or a mixture of different dipolar aprotic solvents. Thereafter, the various solutions are combined in the desired mass ratio, and then continue with the resulting blend solution after homogenization as in the items 1) or 2).

FIGURE DESCRIPTION

APPLICATION EXAMPLES

Example 1: AEM Blends of PVBCI, PBIOO, a Sulfonated Polyethersulfone (SAC098, See Description) Tetramethylimidazole for Quaternization of PVBCI and an Epoxide-Terminated Polyethylene Glycol (Membranes MJK2175 and MJK2176)

Membrane Production and Aftertreatment:

12 g of a 10% by weight solution of polyvinylbenzyl chloride (ALDRICH product no. 182532, structure see FIG. 2) in N,N-dimethylacetamide (DMAc) are mixed with 6 g of a 33.3% by weight solution of 1,2,4,5-tetramethyl-1H-imidazole (TCI Product No. T0971, see FIG. 1 for structure), 6.7 g of a 10% by weight solution of PBIOO (manufacturer FumaTech, structure see FIG. 3) and 2.67 g of a 10% by weight solution of a sulfonated polyethersulfone (SAC098, IEC=1.8 meq $SO_3H$/g, see description) mixed in DMAc. In the case of membrane 2175, 0.25 g of epoxide-terminated polyethylene glycol (molecular mass 500 daltons, ALDRICH product no. 475696) are added to this mixture after homogenization, in the case of membrane 2176 0.25 g of epoxide-terminated polyethylene glycol (Molecular mass 6000 daltons, ALDRICH product no. 731803). After homogenization, the polymer solutions are doctored on a glass plate. Thereafter, the solvent is evaporated in a convection oven at 130° C. for a period of 2 hours. The polymer films are then removed under water and after-treated as follows:

At 60° C. for 24 hours in a 10% by weight solution of tetramethylimidazole in ethanol At 90° C. for 48 hours in a 10 wt % solution of NaCl in water At 60° C. for 48 hours in deionised water Parts of the membranes are placed in an aqueous 1 M KOH solution for a period of 10 days at a temperature of 90° C.*

Membrane Characterization:

Membrane 2175:

ion exchange capacity before/after KOH treatment*[meq OH—/g membrane]: 2.92/2.96

Conductivity before/after KOH treatment*(Cl— form, measured in 0.5N NaCl at room temperature) [S/cm]: 29.3/72.7

Water uptake at 25° C. before/after KOH treatment*[%]: 367/324 Gel content after extraction in DMAc at 90° C. before/after KOH treatment*[%]: 97.6/100

Membrane 2176:

ion exchange capacity before/after KOH treatment*[meq OH—/g membrane]: 2.79/2.84

Conductivity before/after KOH treatment*(Cl— form, measured in 0.5N NaCl at room temperature) [S/cm]: 21.6/69.9

Water uptake at 25° C. before/after KOH treatment*[%]: 370/313 Gel content after extraction in DMAc at 90° C. before/after KOH treatment*[%]: 97.4/97

Comparison of Characterization Results of Membranes 2175 and 2176

Figure 1:
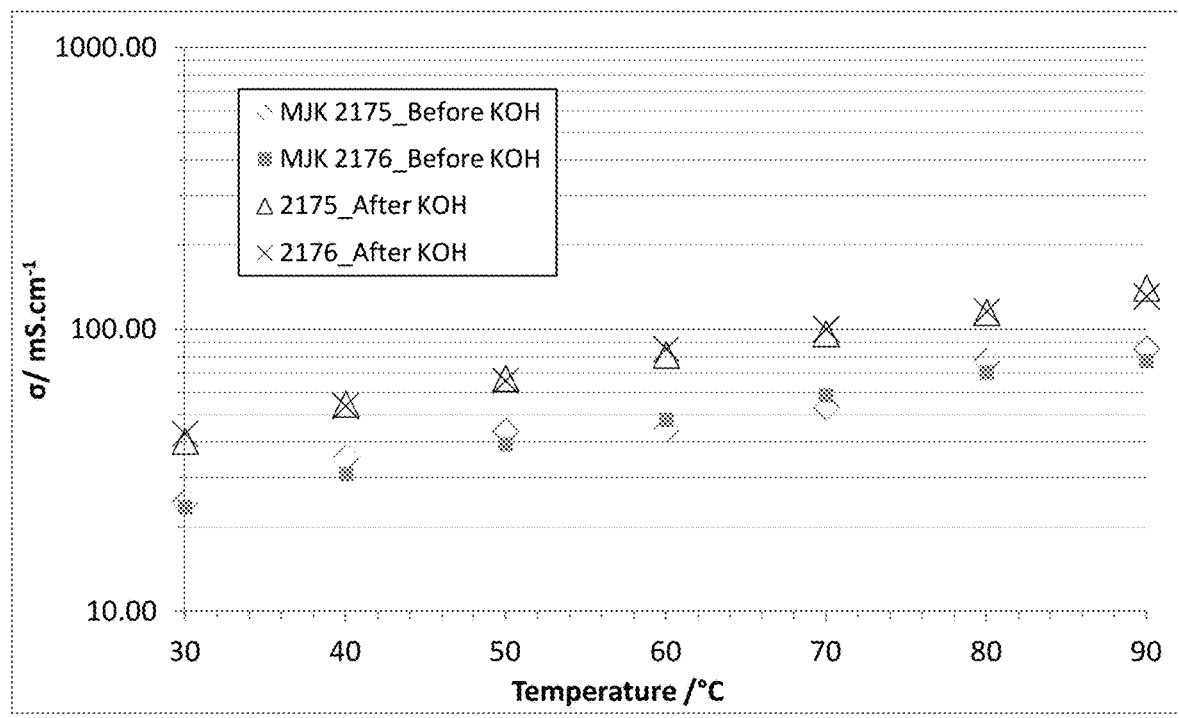
FIG. 1 shows the chloride conductivities of the membranes 2175 and 2176 in the temperature range between 30 and 90° C. with a constant relative humidity of 90%.

Remarkable and surprising in the two membranes 2175 and 2176 of this application example was that the conductivity of the membranes after 10 days of KOH treatment was significantly higher than before the KOH treatment. Because of this surprising finding, the chloride conductivities were measured in another impedance measurement stand as a function of the temperature in a temperature range between 30 and 90° C. at a constant relative humidity of 90%. The chloride conductivity vs. temperature curves of the two membranes 2175 and 2176 are shown in FIG. 1. It shows, that:

1) both membranes have nearly equal conductivity curves;

2) even under these conditions, the conductivities measured after 10 days of KOH incorporation were significantly higher than before, although the molecular masses of the epoxide-terminated polyethylene glycols (PEG) used in membrane production are very different (2175: PEG molecular mass 500 daltons; 2176: PEG molecular mass 6000 daltons).

Figure 2:
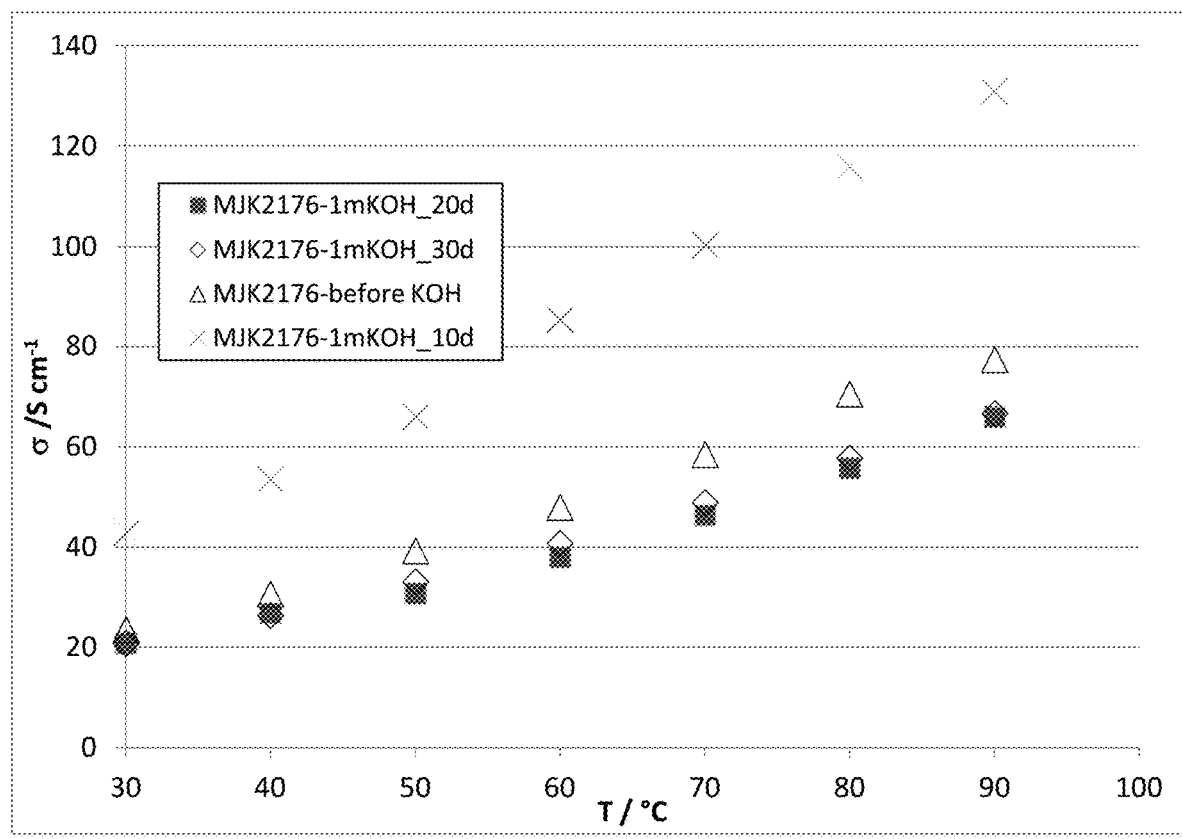
FIG. 2 shows the chloride conductivity of the membrane 2176 before and after 10, 20 and 30 days incorporation in 1M KOH in a temperature range of 30 to 90° C. and a relative humidity of 90%.
Figure 3:
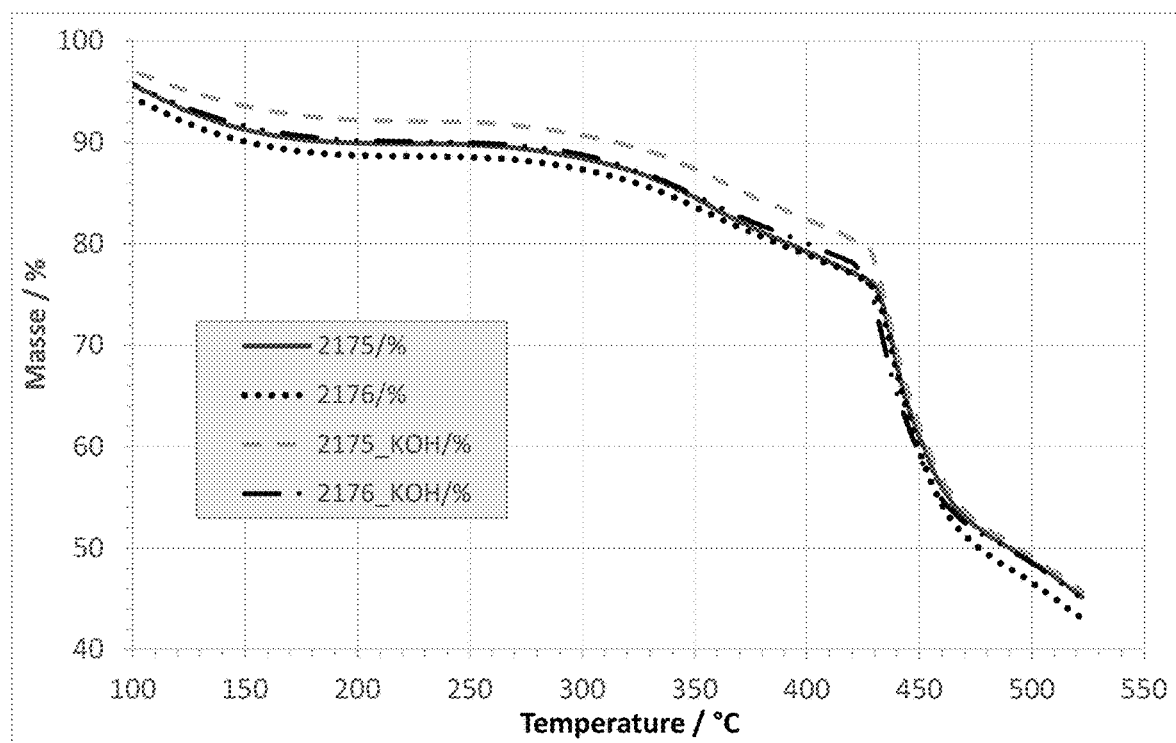
FIG. 3 shows the TGA curves of membranes 2175 and 2176 before and after 10 days treatment in 1 M KOH at 90° C.

The gel content of the membranes of almost 100% surprisingly shows a complete formation of the network of these anion exchange blend membranes. Due to the excellent membrane stabilities, the storage time of membrane 2176 in 1M KOH at 90° C. was extended by a further 20 days to a total of 30 days, and the membrane chloride conductivity was determined experimentally after a total of 20 days and after a total of 30 days in the temperature range from 30 to 90° C. under a relative humidity of 90%. FIG. 2 shows the chloride conductivities of the membrane 2176 before and after 10, 20 and 30 days incorporation in 1 M KOH in the temperature range from 30 to 90° C. There was a surprising development: after 10 days, the conductivity of the membrane was greatly increased over before the KOH treatment, and then decreased to a slightly lower level after 20 days compared to before the KOH treatment. This value then no longer changed in the time interval between 20 and 30 days storage in KOH. Since the thermogravimetry (TGA) studies of the membranes can also give indications of degradation processes in the membranes, for the two membranes 2175 and 2176 TGA curves were recorded before and after the KOH treatment. FIG. 3 shows the TGA curves of membranes 2175 and 2176 before and after 10 days of treatment in 1 M KOH at 90° C. From the TGA curves of both membranes no conclusions can be drawn on degradation processes in KOH solution, since the TGA curves of both membranes before and after 10 days of KOH treatment are almost congruent.

Figure 4:
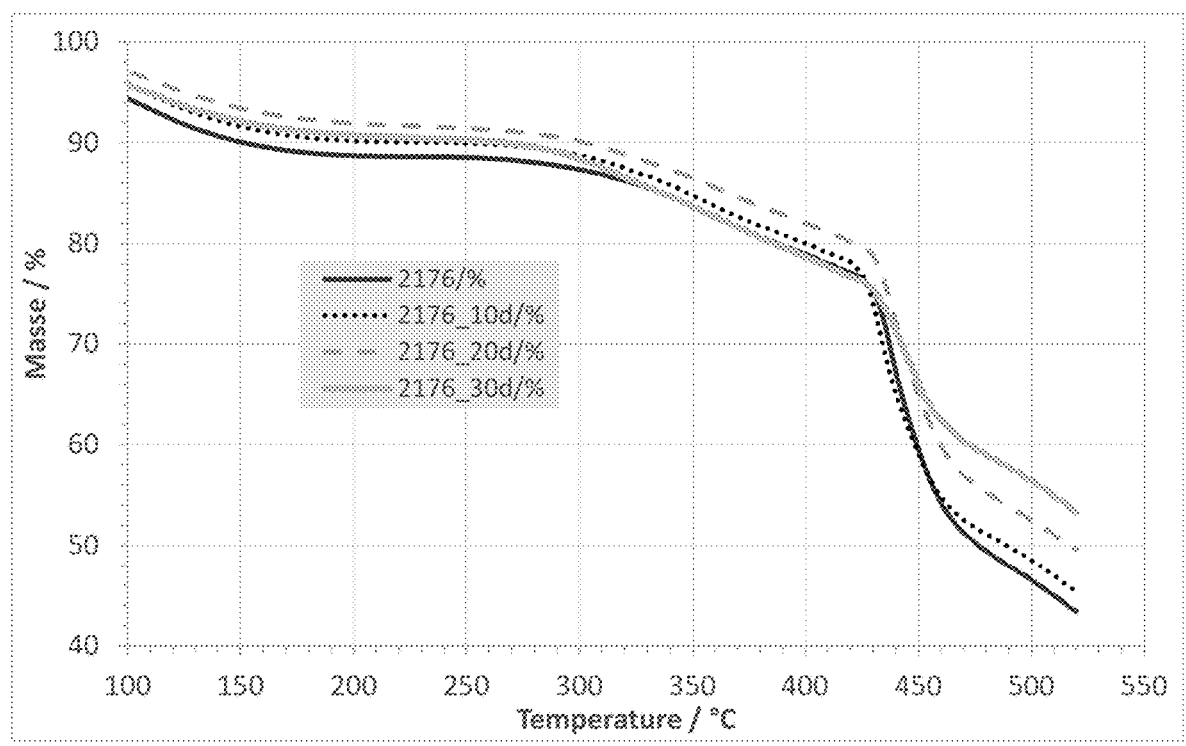
FIG. 4 shows the TGA curves of membrane 2176 before and after 10, 20 and 30 days treatment in 1 M KOH at 90° C.

To determine if in 2176 membrane degradation occurs during the KOH long-term stability test of the membrane, TGA curves of the 2176 were recorded before and after 10, 20 and 30 days of incorporation in KOH. These TGA curves are shown in FIG. 4. From FIG. 4, it can be seen that the TGA curves of all 4 samples are nearly congruent up to a temperature of about 430° C., from which one can conclude that the 2176 still shows no sign of significant degradation even after 30 days of incorporation into KOH which confirms the results of the conductivity tests.

Example 2: AEM Blend of PVBCl, PBIOO, a Sulfonated Polyethersulfone (SAC098, See Description), Tetramethylimidazole for Quaternization of the PVBCl and an Epoxide-Terminated Polyethylene Glycol Having a Lower AEM Content than in Application Example 1 but the Same Molar Ratio Between PBIOO and PEG-Diepoxid 6000 (Membrane MJK2190A)

Membrane Production and Aftertreatment:

12 g of a 10% by weight solution of polyvinylbenzyl chloride (ALDRICH product no. 182532, structure as described) in N, N-dimethylacetamide (DMAc) are mixed with 6 g of a 33.3% by weight solution of 1,2,4,5-Tetramethyl-1H-imidazole (TCI product no. T0971, structure see description), 10.34 g of a 10 wt % solution of PBIOO (manufacturer FumaTech, structure see description) and 2.67 g of a 10 wt % solution of a sulfonated polyethersulfone (SAC098, IEC=1.8 meq $SO_3H$/g, structure see description) mixed in DMAc. After homogenization, 0.386 g of epoxide-terminated polyethylene glycol (molecular mass 6000 daltons, ALDRICH product no. 731803) are added to this mixture. After homogenization, the polymer solution is doctored onto a glass plate. Thereafter, the solvent is evaporated in a convection oven at 130° C. for a period of 2 hours. The polymer film is then removed under water and aftertreated as follows:

At 60° C. for 24 hours in a 10% strength by weight solution of tetramthylimidazole in ethanol At 90° C. for 48 hours in a 10 wt % solution of NaCl in water At 60° C. for 48 hours in deionised water Part of the membrane is placed in an aqueous 1M KOH solution for a period of 10 days at a temperature of 90° C.*.

Membrane Characterization:

ion exchange capacity before/after KOH treatment*[meq OH—/g membrane]: 2.1/2.7

Conductivity before/after KOH treatment*(Cl— form, measured in 0.5N NaCl at room temperature) [S/cm]: 14.3/16.3

Water absorption at 25° C. before/after KOH treatment* [%]: 67/90.5

Gel content after extraction in DMAc at 90° C. before KOH treatment [%]: 95.9

Figure 5:
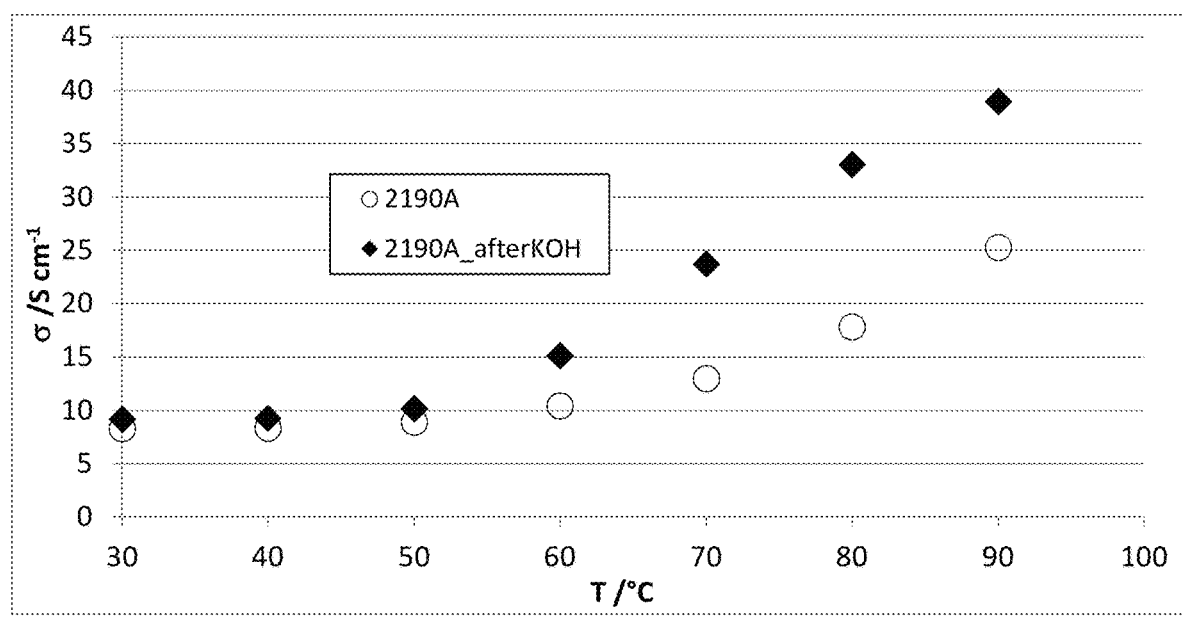
FIG. 5 shows the chloride conductivity of the membrane 2190A before and after 10 days storage in 1 M KOH in the temperature range 30-90° C. at a relative humidity of 90%.
Figure 6:
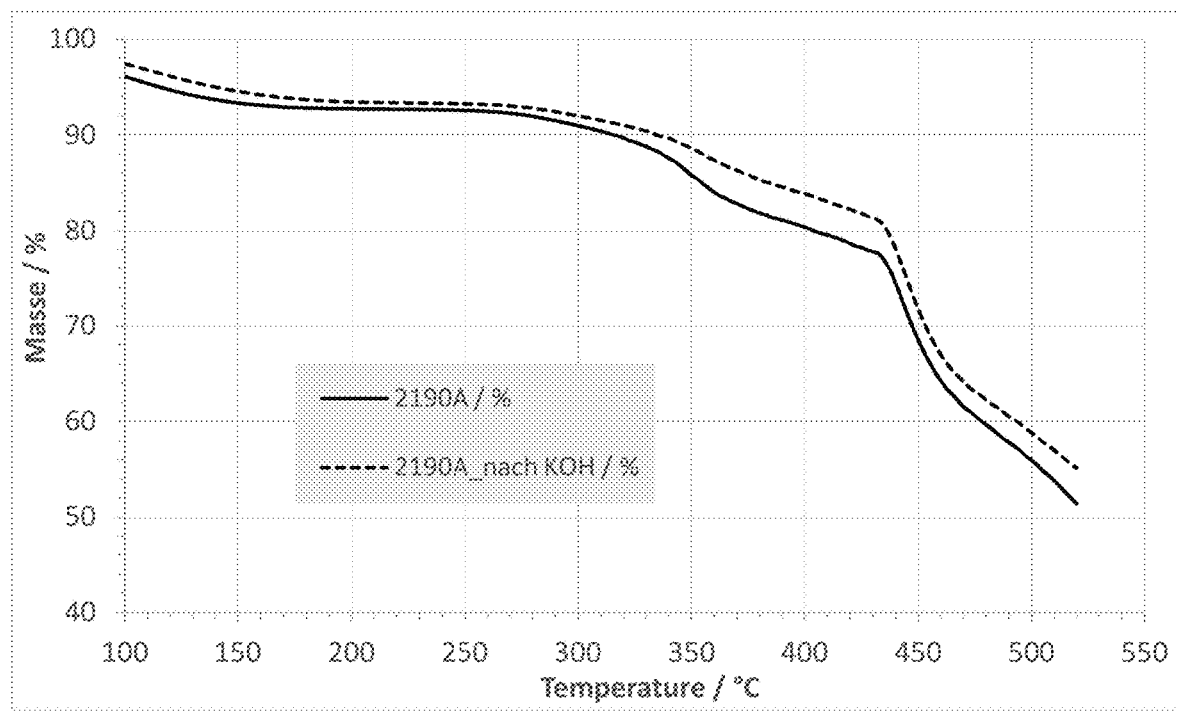
FIG. 6 shows the TGA curves of membrane 2190A before and after 10 days storage in 1M KOH at 90° C.

As with the membranes 2175 and 2176, the chloride conductivity was also determined in this membrane as a function of the temperature between 30 and 90° C. at a relative humidity of 90%. The conductivity curves are shown in FIG. 5. Surprisingly, the conductivity of the 2190A membrane also increases during KOH treatment. In order to determine the thermal stability of the membrane and possible degradation processes in the membrane, TGA curves of the membrane were recorded before and after 10 days of KOH treatment. The TGA curves are shown in FIG. 6. Also in this membrane, the TGA curves before and after 10 days of KOH treatment almost congruent, at least up to a temperature of about 350° C., indicating that after 10 days of incorporation in 1 M KOH at 90° C. still no significant degradation of the membranes has taken place.

Example 3: AEM Blend of PVBCI, $F_6$PBI, a Sulfonated Partially Fluorinated Aromatic Polyether (SFS001, See Description), Tetramethylimidazole for Quaternization of the PVBCI and a Double-Sidedly Epoxide-Terminated Polyethylene Glycol Having a Molecular Mass of 2000 Daltons (Membrane MJK2215)

Membrane Production and Aftertreatment:

3 g of a 20% by weight solution of polyvinylbenzyl chloride (ALDRICH product no. 182532, structure see FIG. 2) in dimethyl sulfoxide (DMSO) are mixed with 3 g of a 33.3% by weight solution of 1,2,4,5-tetramethyl 1H-imidazole (TCI Product No. T0971, see FIG. 1 structure), 10.34 g of a 5% by weight solution of $F_6$PBI (see structure in description) in DMSO and 1.11 g of a 10% by weight solution of a sulfonated partially fluorinated aromatic Polyether (SFS001) in $SO_3$Li form (IEC=2.39 meq $SO_3$H/g, structure see description) mixed in DMSO. After homogenization, 0.193 g of epoxide-terminated polyethylene glycol (molecular mass 2000 daltons, ALDRICH product no. 731811) are added to this mixture. After homogenization, the polymer solution is doctored onto a glass plate. Thereafter, the solvent is evaporated in a convection oven at 140° C. for a period of 2 hours. The polymer film is then removed under water and after-treated as follows:

At 60° C. for 24 hours in a 10% strength by weight solution of tetramethylimidazole in ethanol At 90° C. for 48 hours in a 10 wt % solution of NaCl in water At 60° C. for 48 hours in deionised water Part of the membrane is placed in an aqueous 1M KOH solution for a period of 10 days at a temperature of 90° C.*

Membrane Characterization:

ion exchange capacity before/after KOH treatment*[meq OH—/g membrane]: 2.37/2.7

Conductivity before/after KOH treatment*(Cl— form, measured in 0.5N NaCl at room temperature) [S/cm]: 37.2/29.2

Water uptake at 25° C. before/after KOH treatment*[%]: 56.7/68

Gel content after extraction in DMAc at 90° C. before KOH treatment [%]: 92.7

Figure 7:
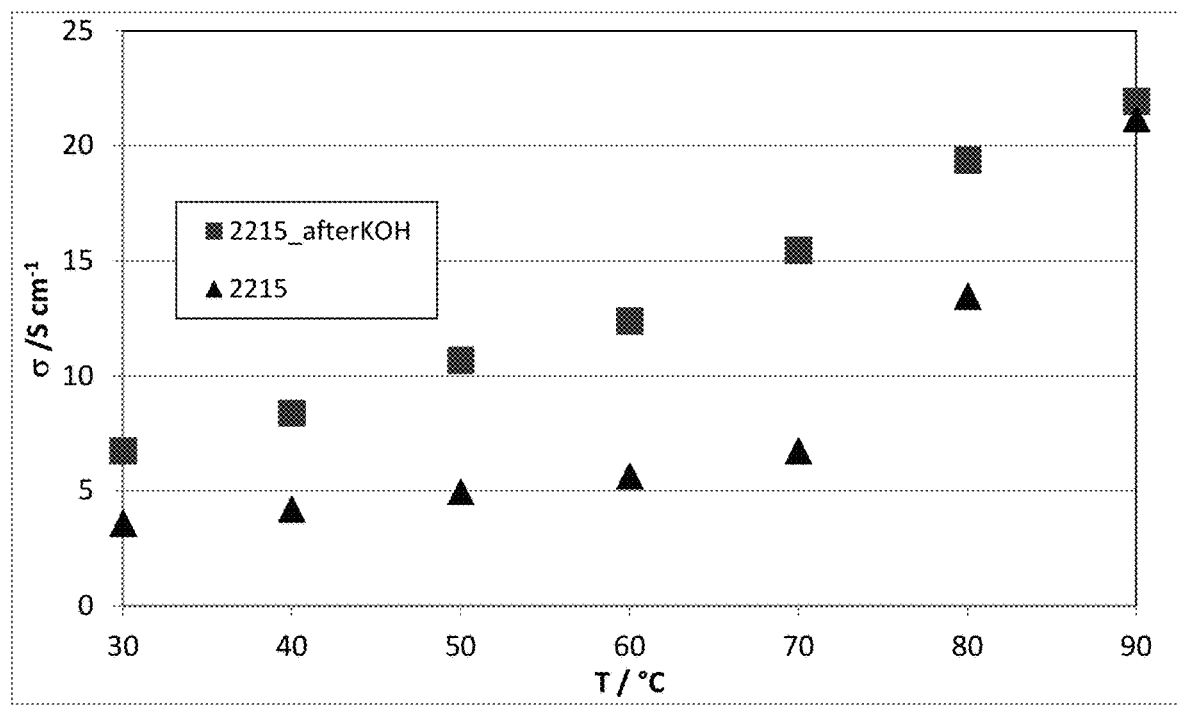
FIG. 7 shows the chloride conductivity of the membrane 2215 before and after 10 days storage in 1 M KOH in the temperature range 30-90° C. at a relative humidity of 90%.
Figure 8:
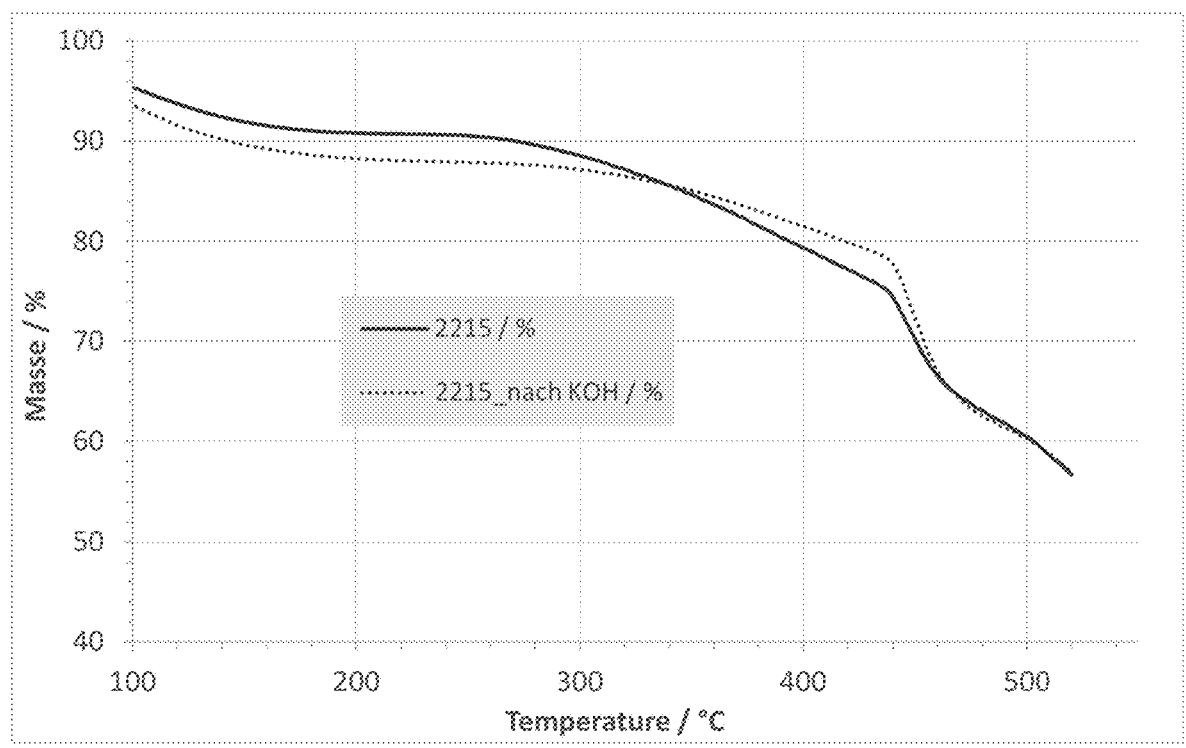
FIG. 8 shows the TGA curves of membrane 2215 before and after 10 days storage in 1M KOH at 90° C.

As with the membranes 2175 and 2176 as well as 2190A, the chloride conductivity was also determined in this membrane as a function of the temperature between 30 and 90° C. at a relative humidity of 90%. The conductivity curves are shown in FIG. 7. Again, as in the previous examples, the chloride conductivity after 10 d storage in 1M KOH at 90° C. is higher than before. In order to determine the thermal stability of the membrane and possible degradation processes in the membrane, TGA curves of the membrane were recorded before and after 10 days of KOH treatment. The TGA curves are shown in FIG. 8. Also in this membrane, the TGA curves before and after 10 days of KOH treatment almost congruent, at least up to a temperature of about 350° C., indicating that after 10 days of incorporation in 1M KOH at 90° C. still no significant degradation of the membranes has taken place.

Comparative Example 1: AEM Blend of PVBCI, PBIOO, a Sulfonated Polyethersulfone (SAC098, See Description), Tetramethylimidazole for Quaternization of the PVBCI with the Same Calculated IEC as the Membranes MJK2175 and MJK2176, but without PEG Diglycidyl Ether (Membrane 2179B)

Membrane Production and Aftertreatment:

6 g of a 10% by weight solution of polyvinylbenzyl chloride (ALDRICH product no. 182532, structure see description) in DMSO are mixed with 2.2 g of a 33.3% by weight solution of 1,2,4,5-tetramethyl-1H-Imidazole (TCI product no. T0971, see structure for description) in DMAc, 4.6 g of a 10% strength solution of PBIOO (manufacturer FumaTech, structure see description) in DMAc and 1.335 g of a 10% by weight solution of a sulfonated polyethersulfone (SAC098, IEC=1.8 meq $SO_3$H/g, structure see description) mixed in DMAc. After homogenization, the polymer solutions are doctored on a glass plate. Thereafter, the solvent is evaporated in a convection oven at 140° C. for a period of 2 hours. The polymer films are then removed under water and after-treated as follows:

At 60° C. for 24 hours in a 10% strength by weight solution of tetramethylimidazole in ethanol At 90° C. for 48 hours in a 10 wt % solution of NaCl in water At 60° C. for 48 hours in deionised water Parts of the membranes are placed in an aqueous 1 M KOH solution for a period of 10 days at a temperature of 90° C.*

Membrane Characterization:

ion exchange capacity before/after KOH treatment*[meq OH—/g membrane]: 2.5/2.64

Conductivity before/after KOH treatment*(Cl— form, measured in 0.5N NaCl at room temperature) [S/cm]: 10.7/15.9

Water uptake at 25° C. before/after KOH treatment*[%]: 63/87

Gel content after extraction in DMAc at 90° C. before KOH treatment*[%]: 94.2

If these data are compared with those of membranes 2175 and 2176, the following results:

The Cl— conductivity is much lower than in the two membranes of the invention. This shows what a positive influence the addition of a hydrophilic PEG phase has to the membrane Water uptake is significantly lower than at 2175 and 2176. This can be explained by the lower hydrophilicity of the control membrane.

Figure 9:
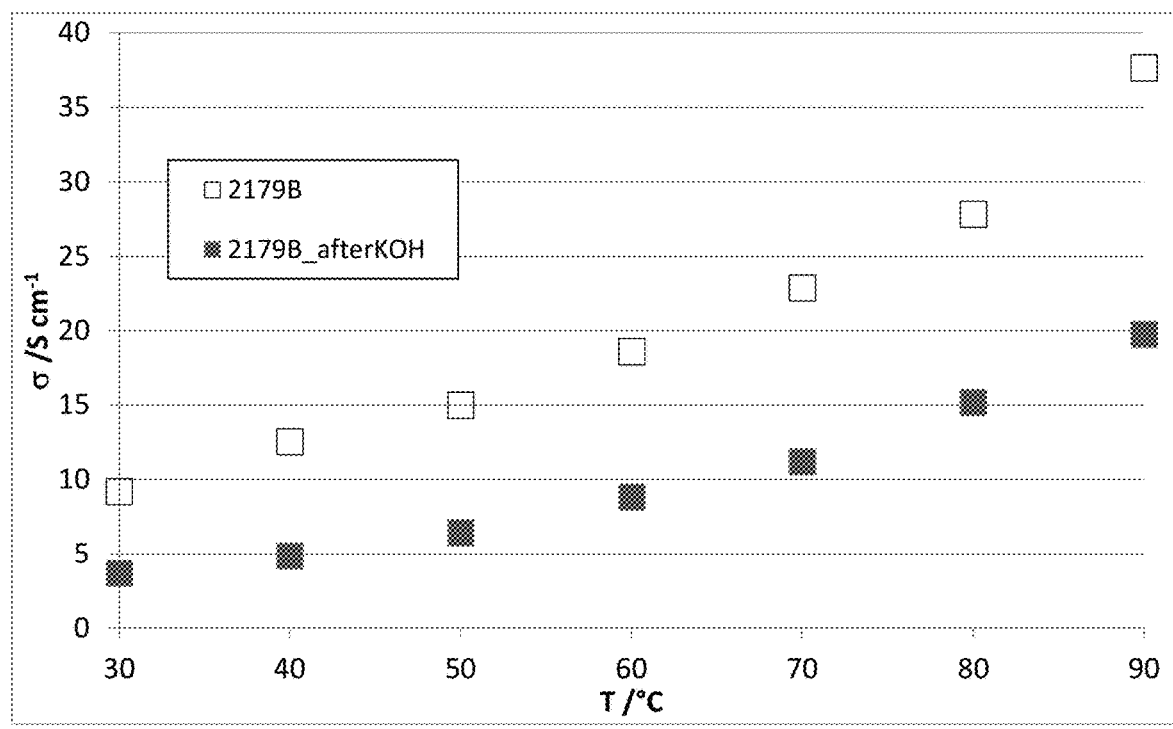
FIG. 9 shows the chloride conductivity of the membrane 2179B before and after 10 days storage in 1 M KOH in the temperature range 30-90° C. at a relative humidity of 90%.

Since the Cl conductivity of the 2179B was higher in conductivity measurement at room temperature and in 0.5N NaCl as at 2175 and 2176 after the KOH treatment, the impedance of the 2179B was again measured in dependence of the temperature at a relative humidity of 90%. The conductivity curve of the 2179B under these conditions is shown in FIG. 9. Here, it is found that, as in the impedance measurement at room temperature in 0.5M NaCl, the chloride conductivity is much lower than that of the 2175 and 2176 containing a PEG phase and that the impedance after KOH treatment is significantly lower than before. Since at 2175 and 2176 the chloride conductivity was higher after 10 d KOH treatment than before, on the one hand shows the conductivity-increasing effect and on the other hand, the stabilizing effect of the presence of a PEG microphase in the blend AEMs.

Comparative Example 2: AEM Blend of PVBCI, $F_6$PBI, a Sulfonated Partially Fluorinated Polyether (SFS001, See Description), Tetramethylimidazole for Quaternization of PVBCI with the Same Calculated IEC as the Membrane MJK2215, but without PEG Diglycidyl Ether (Membrane 2216)

Membrane Production and Aftertreatment:

3 g of a 20% by weight solution of polyvinylbenzyl chloride (ALDRICH product no. 182532, structure as described) in DMSO are mixed with 3 g of a 33.3% by weight solution of 1,2,4,5-tetramethyl-1H-imidazole (TCI Product No. T0971, structure see description) in DMSO, 14.2 g of a 5 wt % solution of $F_6$PBI (structure see description) in DMSO and 1.1 g of a 10 wt % solution of the sulfonated polyether SFS001 (IEC=2.39 meq $SO_3$H/g, structure see description) mixed in DMSO. After homogenization, the polymer solutions are doctored on a glass plate. Thereafter, the solvent is evaporated in a convection oven at 140° C. for a period of 2 hours. The polymer film is then removed under water and after-treated as follows:

- At 60° C. for 24 hours in a 10% strength by weight solution of tetramethylimidazole in ethanol
- At 90° C. for 48 hours in a 10 wt % solution of NaCl in water
- At 60° C. for 48 hours in deionised water
- Parts of the membranes are placed in an aqueous 1 M KOH solution for a period of 10 days at a temperature of 90° C.

Membrane Characterization:
ion exchange capacity before/after KOH treatment*[meq OH—/g membrane]:
2.48/2.7
Conductivity before/after KOH treatment (Cl— form, measured in 0.5N NaCl at room temperature) [S/cm]: 7.4/8.2
Water absorption at 25° C. before/after KOH treatment [%]: 44/33
Gel content after extraction in DMAc at 90° C. before KOH treatment*[%]: 95.7 If these data are compared with those of the membrane 2215, the following results:
The Cl— conductivity at room temperature in 0.5N NaCl is significantly lower than in the inventive membrane 2215. This shows the positive influence of the addition of a hydrophilic PEG phase has to the membrane.
The water absorption is significantly lower than at 2215. This can be explained by the lower hydrophilicity of the control membrane.

Figure 10:
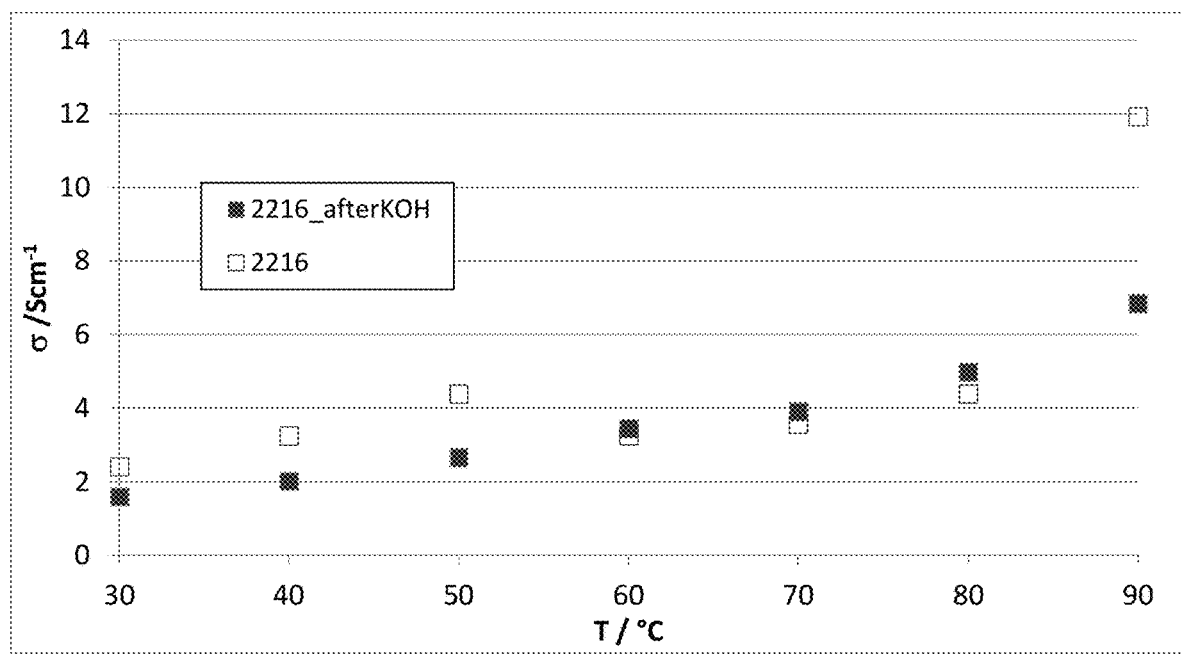
FIG. 10 shows the chloride conductivity of the membrane 2216 before and after 10 days storage in 1 M KOH in the temperature range 30-90° C. at a relative humidity of 90%.

Since the Cl conductivity of the 2216 was higher in the conductivity measurement at room temperature and in 0.5N NaCl as in 2215 after the KOH treatment, the impedance of the 2215 was again measured as a function of the temperature at a relative humidity of 90%. measured. The conductivity curve of the 2215 under these conditions is shown in FIG. 10. Here it can be seen that, as in the impedance measurement at room temperature in 0.5M NaCl, the chloride conductivity is much lower than in the 2215 containing a PEG phase, and that the impedance after the KOH treatment is significantly lower than before. Comparative Example 2 shows, as in Comparative Example 1, on the one hand, the conductivity-increasing effect and, on the other hand, the stabilizing effect of the presence of a PEG microphase in the blend AEMs.

Comparative Example 3: Commercial Anion Exchange Membrane A201 (Development Code A006) of the Manufacturer Tokuyama The structure of this membrane is company secret. The anion exchange group of this membrane is the trimethylammonium group. But it is obviously a cross-linked membrane because the extraction of the membrane gave a gel content of 95%.

Figure 11:
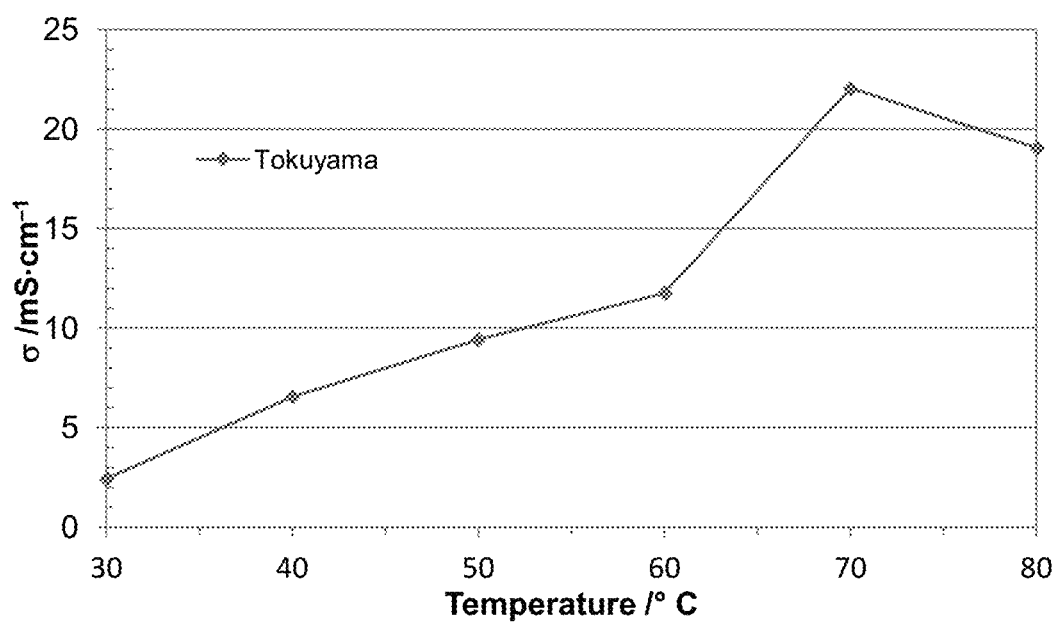
FIG. 11 shows the chloride conductivity of the commercial anion exchange membrane Tokuyama A201 in the temperature range 30-80° C. at a relative humidity of 90%.

Membrane characterization:
Ion exchange capacity [meq OH/g membrane]: 1.7
Conductivity (Cl— form, measured in 1 N NaCl at room temperature) [S/cm]: 12
Water absorption at 30° C. [%]: 19
Gel content after extraction in DMAc at 90° C. before KOH treatment*95
Conductivity (Cl— form, measured at 90° C. and 90% relative humidity, after 10 d incorporation in 1M KOH at 90° C.): 21% of the original conductivity This commercial membrane is thus much less stable in 1M KOH at 90° C. compared to the membranes of the invention. In addition, the chloride conductivity of this membrane is substantially lower than most of the membranes of this invention listed as examples in this chapter. The chloride conductivity of the A201 in the temperature range of 30 to 80° C. at 90% relative humidity is shown in FIG. 11.

Comparative Example 4: Commercial Anion Exchange Membrane FAB from the Manufacturer Fuma-Tech The structure of this membrane is company secret. But it is obviously a cross-linked membrane, as the extraction of the membrane gave a gel content of 93.3%.

Membrane Characterization:
Ion exchange capacity before/after 10 d in 1 M KOH at 90° C. [meq OH—/g membrane]: 0.88/0.89
Conductivity before/after 10 d in 1M KOH at 90° C. (Cl— form, measured in 1 N NaCl at room temperature) [S/cm]: 4/3.2
Water absorption at room temperature/at 90° C. ° C. [%]: 12.1/13.2
Gel content after extraction in DMAc at 90° C. before/after KOH treatment*[%]: 93.3/97

The chloride conductivity of this membrane is substantially lower than that of most of the membranes of this invention listed as examples, which is also (among others) because this membrane is fabric-reinforced.

The invention claimed is:

1. An anion exchange blend membrane, comprising:
   a halomethylated polymer including functional groups $(CH_2)_x$—$CH_2$Hal, Hal being fluorine (F), chlorine (Cl), bromine (Br) or iodine (I) and x being an integer between 0 and 12, inclusive, and one or more cationic function groups derived from a tertiary amine, an alkylated imidazole, an alkylated pyrazole, or an alkylated benzimidazole in a quaternization reaction;
   a basic or neutral non-fluorinated or partially fluorinated inert matrix polymer; and
   a polyethylene glycol with epoxy or halomethylene ends groups on one or both chain ends.

2. The anion exchange blend membrane of claim 1, further comprising a polymer with acidic functional groups $SO_3M$, $PO_3M_2$ or COOM, M being a cation.

3. The anion exchange blend membrane of claim 1, further comprising a polymer containing sulfinate groups $SO_2M$, M being a cation.

* * * * *